Dec. 19, 1933.　　　F. JARDINE　　　1,939,778
PISTON
Filed June 29, 1932　　2 Sheets-Sheet 1
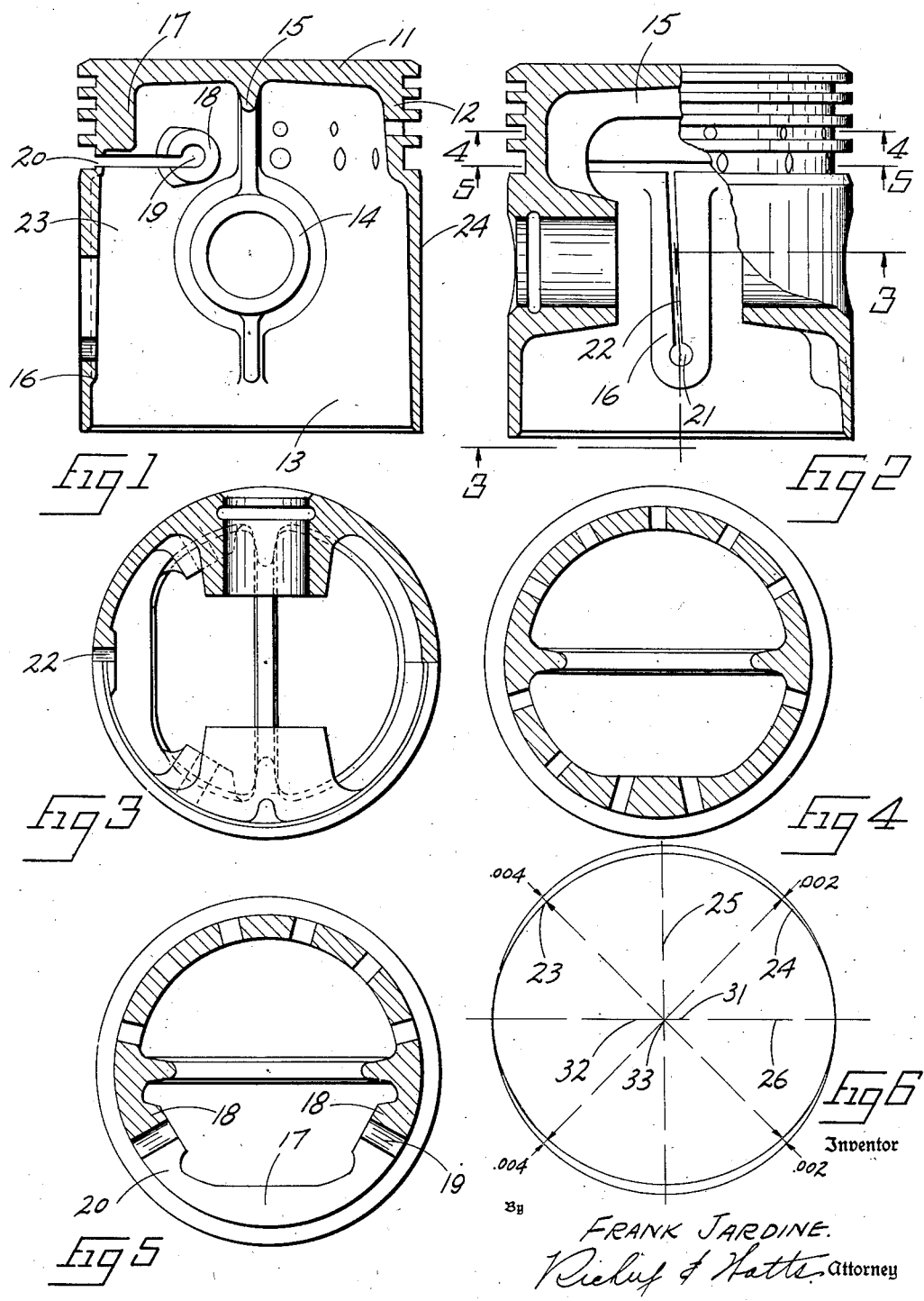

Dec. 19, 1933.  F. JARDINE  1,939,778
PISTON
Filed June 29, 1932  2 Sheets-Sheet 2
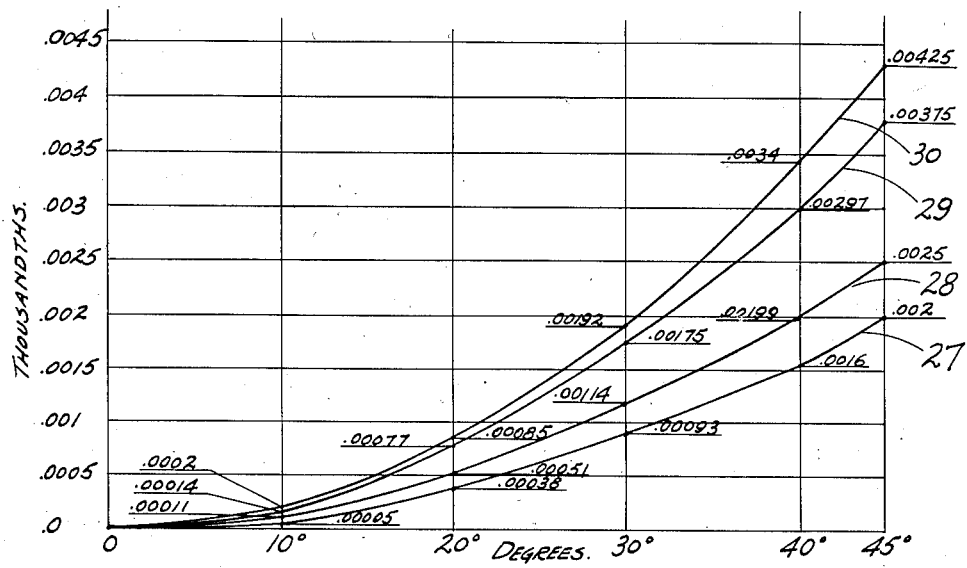
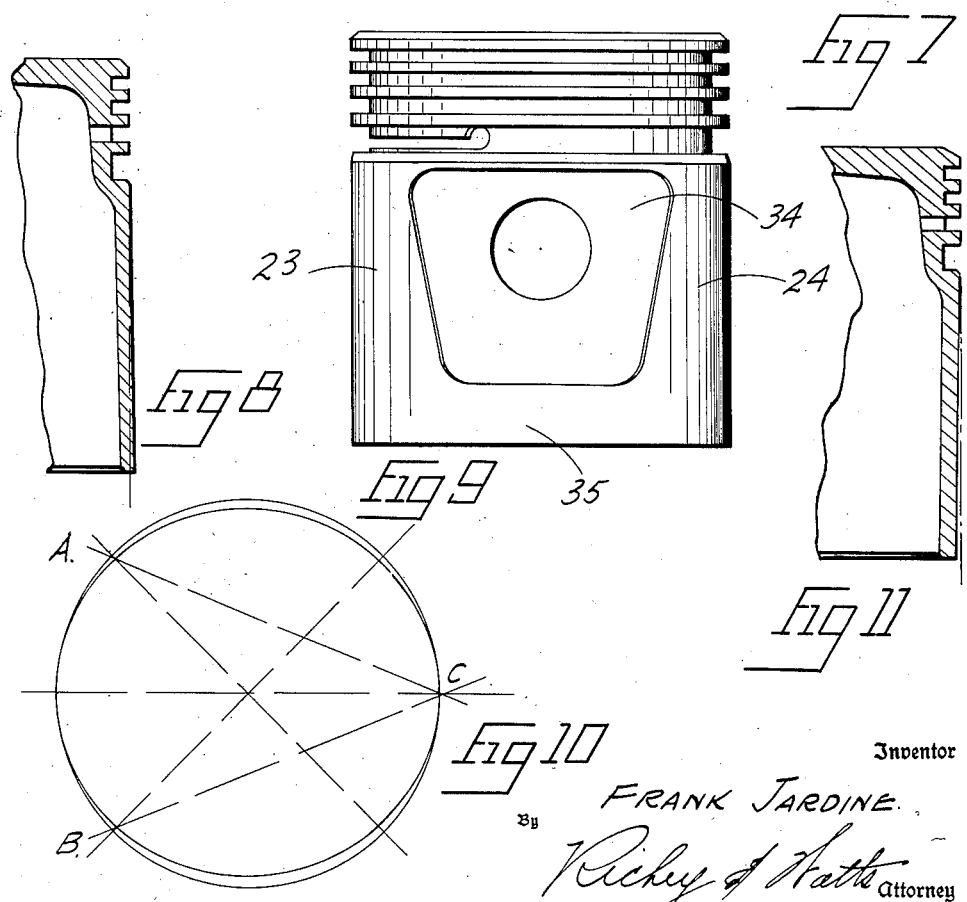
Inventor
FRANK JARDINE.
By
Richey & Watts Attorney Patented Dec. 19, 1933

1,939,778

UNITED STATES PATENT OFFICE 1,939,778

PISTON

Frank Jardine, Cleveland, Ohio, assignor, by mesne assignments, to The Cleveland Trust Company, trustee, Cleveland, Ohio, a corporation of Ohio Application June 29, 1932. Serial No. 619,947

14 Claims. (Cl. 309—11)

This invention relates to pistons and more particularly to an improved aluminum or other light metal alloy piston for internal combustion engines.

This invention is an improvement over that disclosed and claimed in the co-pending application of George L. Moore, Serial No. 462,761, filed June 21, 1930.

In the manufacture of internal combustion engines it is extremely desirable to use pistons composed of aluminum or similar light metal alloy in order to reduce the weight of the reciprocating parts and to increase the rate of heat conduction from the head of the piston, which is directly exposed to the combustion chamber, to the walls of the cylinder which are normally cooled by water or air. In order to operate satisfactorily, however, it is necessary that the piston fit the cylinder with a relatively small clearance at all temperatures in order to prevent piston slap and to reduce oil pumping between the walls of the piston and the cylinder wall, while at the same time having sufficient clearance to prevent any possibility of the piston seizing within the cylinder at any operating temperature. It is also necessary that the piston have sufficient strength to properly transmit the explosion force to the connecting rod and to withstand the side thrusts of the piston against the cylinder wall resulting from the angularity of the connecting rod, and that the piston have sufficiently large lateral bearing areas against the cylinder wall to avoid high pressures on relatively small areas and thereby prevent scoring and minimize the rate of wear of the piston. It is also desirable to reduce to a minimum the cost of manufacture and assembly of the piston. The most satisfactory piston, so far as strength, durability, heat conductivity and economy of manufacture are concerned, is a simple full trunk piston consisting of a cup-shaped head and a cylindrical skirt continuously integral at its upper edge with the head and carrying wrist pin bosses. In order to use this type of piston, however, it is necessary to fit the same to the cylinder with a relatively large clearance when the piston is cold by reason of the large difference in the co-efficients of thermal expansion of aluminum alloy and the cast iron of which the cylinder is made. This results in an objectionable noise known as piston slap by reason of the lateral play of the piston in the cylinder and also in excessive oil pumping when the engine is operated at a relatively low temperature, as frequently occurs in automobile engines and the like.

A great many efforts have been made to construct aluminum alloy pistons in such a manner as to compensate for the excessive expansion of the aluminum so that the clearance may be maintained at or near the desired minimum at all temperatures. Some of the earliest of these efforts consisted in making the piston skirt at least partially separated from the head and providing the same with vertical slots so that the skirt is relatively compressible to absorb expansion. Pistons of this type have been found to operate satisfactorily, but the slotting of the skirt also permits flexing of the same under the lateral thrusts and the repeated flexures of the portions adjacent the slots tend to result in fatigue of the metal and permanent deformation or breakage of the skirt. The separating of the skirt from the head also reduces the flow of heat from the head to the skirt so that an excessive portion of the heat absorbed by the head must be transmitted to the cylinder wall through the piston rings. A great many of these prior efforts to absorb the expansion of the skirt by compression, also caused deformation of the skirt during expansion and contraction which results in high spots at various points on the bearing surfaces preventing a full uniform bearing between the skirt and the cylinder wall.

Other efforts to compensate for the expansion have been made by separating the thrust faces from each other and connecting the same together across the wrist pin bosses by inserts of a different material having a relatively low co-efficient of expansion, such as steel struts. These efforts, however, have been attended with considerable difficulties in obtaining a permanent bond between the inserts and the piston body, and in casting the piston. In accordance with the customary practice in insert casting generally the inserts have been placed in molds and the aluminum cast about them. The freezing of the aluminum is accompanied by an initial high crystallization shrinkage and a subsequent contraction upon cooling from the freezing point to normal temperature. This freezing and contraction of the aluminum alloy about the low expansion inserts necessarily results in distortion of the casting. In addition, whatever arrangement is used for obtaining a connection between the aluminum and the insert, the different rates of expansion and contraction of the two metals during use tends to destroy or loosen the connection. Furthermore, since the piston body is positively restricted against expansion at certain points a tendency to distort the skirt exists at all times during heating or cooling of the piston in operation, resulting in imperfect bearing surfaces between the skirt and the cylinder wall.

It has also been proposed to form the piston skirts substantially elliptical with the major axis at right angles to the wrist pin axis so as to reduce the expansion across the major axis and absorb the greater portion of the expansion across the minor axis. This arrangement, however, results in an extremely narrow bearing area between the thrust faces and the cylinder wall when the piston is cold, leaving room for the piston to slide laterally along the wrist pin and thereby slap, and also results in excessive wear of the narrow bearing areas so that the initial clearance is rapidly increased to the point where the piston will slap across the thrust faces. The proposal to grind the piston by inserting an oval plug in the bottom of the skirt, grinding the surface cylindrical and then removing the plug has also been unsatisfactory, since the shape assumed by the skirt after removal of the plug can not be accurately predetermined within close limits.

In all the prior efforts to compensate for the excessive expansion of the aluminum the cost of manufacture of the piston has been substantially increased over the cost of manufacturing a simple trunk type piston by reason of relatively expensive machining operations upon the casting or by reason of the complications and scrap loss in the casting process itself. In addition, the working tolerances in assembling the pistons have been relatively small, resulting in an increased cost of assembly.

The principal object of the present invention is to maintain a relatively close fit between portions of the skirt of the piston at all temperatures so as to prevent piston slap and oil pumping while accommodating the differential thermal expansion between the piston and the cylinder wall without danger of the piston seizing or scoring, and to accomplish these results in a unitary one-piece piston free from inserts of a different metal which may be produced from a simple trunk type casting with a minimum of machining and slotting operations.

Another object is to obtain a bearing between portions of the thrust faces of the piston skirt and the cylinder wall when the piston is cold arranged in such a manner as to prevent lateral play of the piston along the wrist pin axis, as well as at right angles to the wrist pin axis, and to obtain substantially a full even bearing between both thrust faces and the cylinder wall when the piston is hot. Another object is to reduce the danger of collapse or deformation of the slotted portions of the piston skirt and to avoid the possibility of splitting or cracking of the skirt adjacent the slotted portions. Other objects are to provide a piston construction which is extremely simple and economical to cast and machine, to provide an improved arrangement of the surfaces of the skirt to obtain a close fit of at least portions of the skirt at all temperatures, and to provide a durable and reliable piston which may be manufactured and assembled in engines with the usual tolerances of production methods without danger of the piston seizing or scoring when the engine is operated.

Other objects relating to details of construction and economies of manufacture will appear hereinafter.

In the accompanying drawings which illustrate preferred embodiments of the invention:

Figure 1 is a vertical sectional view of a piston taken on a plane perpendicular to the wrist pin axis.

Figure 2 is a similar sectional view taken on a plane through the wrist pin axis, a portion of the upper part of the skirt being shown in elevation.

Figure 3 is a horizontal sectional view taken on the plane indicated by the line 3—3 of Figure 2.

Figure 4 is a horizontal sectional view taken on the line 4—4 of Figure 2.

Figure 5 is a horizontal sectional view taken on the line 5—5 of Figure 2.

Figure 6 is a clearance diagram indicating the relation of the piston to the cylinder wall when the piston is cold.

Figure 7 is a chart of the clearances between the piston wall and the cylinder when the piston is cold.

Figure 8 is a detailed sectional view of one side wall of the piston indicating one manner of tapering the piston skirt.

Figure 9 is a side elevation of a slightly modified form of the piston.

Figure 10 is a diagram illustrating the relation between the piston and the cylinder wall.

Referring to the drawings the piston illustrated in Figures 1 to 5 inclusive, is generally of the full trunk type of piston including a head 11 having a depending cylindrical flange 12 grooved for the reception of piston packing rings and a skirt 13 integral with and depending from the lower edge of the ring flange 12. Piston pin bosses 14 are formed integrally with the piston skirt and with a reinforcing rib 15 which extends upwardly above each wrist pin boss and across the inside of the head. On one side of the piston the skirt is cast with a longitudinally extending thickened portion 16 and the ring flange 12 is similarly provided with a thickened portion 17 immediately thereabove. At the ends of the thickened portion 17 the ring flange 12 and skirt 13 are formed with small inwardly projecting bosses 18. The piston is cast preferably in permanent molds in exactly the same manner as a full trunk type piston in the form of a cylindrical cup with the skirt integral with the head and the bosses and reinforcing ribs and pads projecting from the inner surface. The characteristics of the piston which compensate for expansion are given to it in the machining operations.

In machining the piston, small holes 19 are drilled through the bosses 18 and connected by a slot 20 extending through the wall of the piston between the bottom of the flange 12 and the top of the skirt 13. A small hole 21 is drilled through the lower end of the thickened portion or pad 16 and a slot 22 is cut in the wall of the skirt extending at a slight angle to the vertical from the hole 21 up to and intersecting the slot 20. The opposite side of the piston is unslotted and is left integrally connected to the lower edge of the ring flange 12.

The slotted side of the piston skirt through an angle of about 45 degrees on each side of the plane perpendicular to the wrist pin axis is designated 23 in the drawings and is termed the minimum thrust face, since this side of the skirt is intended to be arranged in the engine cylinder to receive the lateral thrusts of the piston on the compression stroke. The opposite side of the piston through a similar or greater angle on each side of the plane perpendicular to the wrist pin axis is designated 24 and is termed the maximum thrust face, this face being arranged in the engine cylinder to receive the lateral thrusts of the piston on the explosion stroke.

The outer surface of the ring flange 12 is formed with the usual piston ring grooves and is machined in the customary manner to a diameter small enough so that it will not contact with the cylinder wall at any time. The skirt of the piston is ground, preferably by means of a cam grinder, to the shape indicated by the clearance diagrams Fig. 6 and Fig. 7. These diagrams illustrate the specific clearances for one particular embodiment of the invention, it being understood that the invention is not limited to any particular dimensions or clearances. In Figure 6 the outer circular line designates the cross section of an engine cylinder. The inner line forming a closed curve disposed within the outer circle represents the periphery of the piston, the clearances between the piston and the cylinder being exaggerated in the drawings. The line 25 represents the wrist pin axis while the line 26 represents the line of thrust perpendicular to the wrist pin axis. The maximum thrust face 24 is shown on one side of the diagram extending substantially 45 degrees on each side of the line 26 while the minimum thrust face 23 is similarly arranged on the opposite side of the diagram. The piston is fit to the cylinder with a fairly small clearance between the centers of the thrust faces and the cylinder walls at the ends of the line 26. In a piston for a cylinder with a diameter of about three inches the clearance at the ends of the line 26 may be about .001 of an inch. If desired the piston may be fit when cold with no clearance at these points, or, in other words, in contact with the cylinder across the diameter 26. The line 26 represents the controlling diameter which determines the minimum clearance of the piston in the cylinder. As shown in Figure 6 the periphery of the piston contacts the cylinder wall at the ends of the diameter 26, but it will be understood that the desired minimum clearance exists between the piston and cylinder at these points, and the clearances which will be described for the various portions of the remainder of the skirt are in excess of the minimum clearance determined by the diameter of the piston on the line 26.

The maximum thrust face 24 is ground with a progressively increasing excess clearance throughout the full height of the skirt in each direction from the plane represented by the line 26. A specific illustration of this increasing clearance is shown in the graph, Figure 7, in which the abscissa are degrees about the circumference of the piston from the center of the thrust face and the ordinates are excess clearances between the surface of the piston and the minimum clearance at the center of the thrust face expressed in ten-thousandths of an inch. The curves 27 and 28 represent respectively the minimum and maximum excess clearances on the maximum thrust face through 45 degrees on each side of the center of the thrust face. It will be seen that this excess clearance increases from zero to about .00225 of an inch plus or minus .00025 in passing from the center of the thrust face to each corner of the thrust face about 45 degrees from the center. The minimum thrust face 23 of the skirt is ground with a more rapidly increasing excess clearance from the center of the thrust face to the corners about 45 degrees on each side of the center. The curves 29 and 30 in Figure 7 represent respectively the minimum and maximum excess clearances on the minimum thrust face of the skirt. It will be seen that this clearance on the minimum thrust face 23 increases from zero at the center of the thrust face to .004 plus or minus .00025. Preferably the contours of the maximum and minimum thrust faces are not true circular arcs, but drop off slightly more rapidly than true circular arcs as they approach the corners of the thrust face. However, for purposes of illustration, it may be said that the maximum thrust face 24 conforms substantially to the arc of a circle struck from the point 31 in Figure 6 and the minimum thrust face 23 conforms substantially to the arc of a circle struck from the point 32, the point 33 being the true center, or the axis of the cylinder. It will be evident that the approximate center 31 of the maximum thrust face 24 is spaced toward that thrust face from the center 33 substantially half the distance that the approximate center 32 is spaced in the opposite direction from the true center 33.

The side walls of the skirt between the adjacent corners of the maximum and minimum thrust faces are ground with sufficient clearance from the cylinder wall so that these surfaces may be said to be relieved so as to be substantially out of contact with the cylinder wall at all temperatures.

In certain cases the piston skirt is also formed with a slight taper longitudinally. This will depend primarily upon the size of the piston and the stiffness of the skirt and to some extent upon the cooling characteristics of the engine. It will be evident that since the material of the piston and the material of the cylinder wall expand at different rates, the total amount of differential thermal expansion to be accommodated varies directly with the circumferential length of the piston. For this reason it has been customary to fit cast iron pistons, for example, with about .001 clearance per inch of piston diameter, and the same practice has been found to be successful with the various types of split skirt and controlled diameter aluminium pistons heretofore used.

With the piston forming the subject matter of the present invention, it is found that an extremely small minimum clearance across the center of the thrust faces may be successfully used. It is also desirable to maintain the clearance between the cylinder and the piston pin boss carrying walls of the piston small enough to prevent excessive creeping of oil up the cylinder wall. Where the total amount of differential expansion to be accommodated by the piston is relatively large, due to the size of the piston and the cooling characteristics of the engine, or where the skirt is unusually stiff, it is necessary to increase the minimum clearance across the centers of the thrust faces at the top of the piston skirt so that not all of the differential expansion between the piston and cylinder wall is necessarily absorbed by the slot 22 and the change of the shape of the piston skirt to a substantially cylindrical form. In such cases it may be found to be desirable to taper the entire circumference of the skirt so that the diameter at any particular point in the circumference is larger at the bottom of the skirt than at the top as illustrated in Figure 8. This arrangement effects the essential minimum clearance of the piston on the diameter through the centers of the thrust faces at the bottom of the skirt, leaving the centers of the thrust faces at the top of the skirt with a slightly greater clearance from the cylinder wall so that a portion of the differential expansion is absorbed at the top of the skirt in increasing the diameter of that part with respect to the bottom of the skirt.

However, the bottom portion of the skirt below the lower end of the slot 22 is an unbroken circle of metal and sufficient clearance must, therefore, be provided below the piston pin bosses to absorb the expansion of this lower portion of the skirt by its change in shape from its initial form to a substantially cylindrical form conforming to the cylinder wall. Accordingly, the relation of this portion of the skirt to the cylinder wall is relatively fixed regardless of the relation of the top of the skirt to the cylinder wall. In instances, therefore, where the size of the piston and the cooling characteristics of the engine are such that the top of the skirt may be fit to the cylinder wall with an extremely small minimum clearance or with no clearance across the centers of the thrust faces, it may be desirable to taper the skirt in the opposite direction from that illustrated in Figure 8, so that the bottom portion of the skirt is uniformly a small amount smaller than the top portion of the skirt. This latter arrangement is preferred in the more common installations, since it permits fitting the upper portion of the skirt which is rendered flexible by the slot 22 with an extremely close clearance to avoid piston slap at any temperature while insuring that the metal in the continuous ring at the bottom of the skirt will have ample room to expand without seizing. This latter point is particularly important because while the temperature of the bottom of the skirt is normally lower than the top of the skirt while the engine is running, when the engine is stopped after running at high working temperatures the heat in the head of the piston immediately flows throughout the entire piston body and all portions thereof assume the same temperature.

When the piston is initially fitted to the cylinder the relation between the piston contour and the cylinder is substantially as indicated in Figure 6. When the engine is then started the lateral thrust of the explosion stroke is taken by the contact between the maximum thrust face 34 and the cylinder wall. The clearance between the corners of the thrust face 24 and the cylinder wall is sufficiently small to prevent lateral play of the piston along the wrist pin axis. The lateral thrusts of the compression stroke are taken by the engagement of the center of the minimum thrust face 23 with the cylinder wall. These thrusts are normally small compared with the thrust of the explosion stroke and, therefore, the initial narrow band between the center of the minimum thrust face and the cylinder wall is sufficient. Lateral play of the piston along the wrist pin sufficient to cause a piston slap is thus prevented by the substantially triangular engagement between the piston and cylinder as indicated in Figure 10. The initial clearance between the corners of the thrust face 23 and the cylinder wall is sufficient if the piston were not otherwise held to permit lateral movement of the piston in the cylinder of such an extent as to cause an audible slap. However, the clearance between the corners of the maximum thrust face 24 and the cylinder wall is small enough to prevent lateral movement of the piston. If the same clearance existed on the corners of the other thrust face, however, there would be insufficient provision for the thermal expansion of the piston. Accordingly, the piston is held against lateral play sufficient to cause a slap by the arc A—B and the point C as shown in Figure 10.

As the piston heats up from operation in the engine the head 11 expands uniformly in all directions. The maximum thrust face 24 of the skirt and the adjacent walls connecting this portion to the wrist pin bosses are integrally connected at the top to the lower edge of the head and therefore would, if unaffected by other factors, expand uniformly and retain their original shape with increased dimensions. The minimum thrust face 23, however, is separated from the head by the slot 20 and therefore expands independently of the head. At the sides this thrust face is connected to the wrist pin bosses 14 which move apart at the same rate as the head expands. This separating movement of the sides of the minimum thrust face 23 tends to draw in the center of this thrust face and reduce the curvature of its arc. As a consequence the large clearance existing at the corners of the minimum thrust face 23 as shown in Figure 6, tends to close up and this thrust face tends to assume an arcuate form conforming to the shape of the cylinder wall. The circumferential expansion of the metal of the piston skirt and the radial expansion of the maximum thrust side of the piston is absorbed by the slot 22, the sides of which move slightly toward each other. The change in shape of the portion of the minimum thrust face 23 below the end of the vertical slot 22 tends to cause a corresponding change in shape of the entire continuous ring at the bottom of the skirt including the lower portions of the maximum thrust face 24. This force slightly distorts the maximum thrust face so as to absorb a small portion of the excess clearance existing at the corners of the maximum thrust face. When the piston reaches its maximum operating temperature, therefore, the bearing on each thrust face is a wide uniform bearing extending throughout at least the full thrust faces through about 45 degrees on each side of the center line. The boss carrying portions of the skirt between the opposite thrust faces are preferably, as pointed out above, provided with sufficient clearance to constitute a safety factor so that these portions never move into full contact with the cylinder wall. However, the expansion reduces the clearances of these portions and since the clearance increases progressively a substantial portion of these walls reaches a bearing relation with the cylinder wall in continuation of the bearing area of the thrust faces.

The excess clearance at the corners of the maximum thrust face 24 is slightly decreased as the piston reaches full operating temperature, but the curvature of this thrust face does not become truly circular in cross section. It has been found that the cylinder walls in a multi-cylinder engine which are initially ground to a true cylindrical shape deviate slightly from that shape under operating temperature into a roughly oval form with the major axis of the section perpendicular to the wrist pin axes of the pistons, due to unequal thermal expansion. This results in part from the fact that the portions of a cylinder immediately adjacent to the other cylinders reach a higher temperature than the portions of the cylinders remote from the other cylinders, since the cooling medium such as water or air which normally surrounds the cylinders must absorb heat from both of two adjacent cylinders at the point between them. Other factors such as the integral connection of the cylinders together into a block and the disposition of ribs and fins and the like also contribute to the uneven expansion of the cylinder walls so that these walls depart from a true cylindrical contour in cross section. As a result the piston constructed in accordance with this invention has at normal operating temperatures a full even bearing against the cylinder wall on the maximum thrust face and conforms accurately under operating conditions to the contour of the cylinder wall.

A slightly modified form of the piston forming the subject matter of this invention is illustrated in Figure 9. In this form the thrust faces 23 and 24 are made substantially the same as in the embodiment previously described, but a wedge-shaped relief 34 is formed about the piston pin bosses extending from a point below the lowest ring groove to a point near the bottom of the skirt, but leaving a band 35 below the relief. At the top of the skirt the relief 34 extends circumferentially substantially to the corners of the thrust faces, that is about 45 degrees from the wrist pin axis on each side. Accordingly, the diagram of the top portion of the skirt is as indicated in Figure 6. Adjacent the bottom of the skirt where the operating temperature is normally lower than at the top, the relief is narrower so that the bearing areas on the opposite side of the piston extend closer to the vertical plane of the wrist pin axis. The band 35 below the relief is ground in the same manner as the boss carrying walls of the previous embodiment so that the contour of the piston at the bottom of the skirt is the same as that shown in Figure 6. With this embodiment it is ordinarily unnecessary to taper the skirt to a larger diameter at the bottom, since the greater extent of the relief at the top of the skirt provides ample clearance. However, it is desirable in some cases, as pointed out above, to taper the skirt to a smaller diameter at the bottom where the top of the skirt may be fit with a relatively small clearance in order to prevent seizing of the piston when the engine is stopped after being run at full operating temperature. The operation of this form of the piston is substantially the same as that previously described, except that the relieved area 35 does not contact with the cylinder walls at any time.

Although preferred embodiments of the invention have been described in considerable detail, it is to be understood that modifications and rearrangements may be made without departing from the spirit and scope of the invention as defined in the following claims.

I claim:

1. A piston comprising a head having a depending ring flange and a skirt integral with the head and having aligned wrist pin bosses, the wall of the skirt being substantially oval with its greatest diameter lying in a plane substantially perpendicular to the axis of the wrist pin bosses, a portion of the skirt on one side of the wrist pin bosses being arranged to receive the maximum thrust of the piston in an engine cylinder and having a curvature but slightly greater than the curvature of a true cylinder concentric with the piston axis and tangent to the skirt at its greatest diameter, and the portion of the wall of the skirt on the opposite side of the bosses having a substantially greater curvature than that of the first mentioned portion.

2. A piston comprising a head having a substantially cylindrical ring flange and a skirt having aligned wrist pin bosses integrally connected to the head, said skirt including a maximum thrust face on one side of the wrist pin bosses substantially conforming in cross section to an arc struck from a center disposed between the center line of the piston and the center of said maximum thrust face, and having on the other side of said wrist pin bosses a minimum thrust face substantially conforming in cross section to an arc struck from a center spaced toward said minimum thrust face a substantially greater distance from the center line of the piston than said first mentioned center.

3. A piston comprising a head having a substantially cylindrical ring flange, aligned wrist pin bosses depending below and integral with said ring flange and a skirt including a maximum thrust face integral with said wrist pin bosses and extending between the same on one side, said maximum thrust face having a curvature slightly greater than that of a true cylinder concentric with said ring flange and being integral at its upper edge with the lower edge of said ring flange, and a minimum thrust face integral with said bosses and extending between the same on the opposite side thereof and having a curvature substantially greater than the curvature of said maximum thrust face, said minimum thrust face being spaced at its upper edge from the lower edge of said ring flange.

4. A piston comprising a head having a substantially cylindrical ring flange, aligned wrist pin bosses depending below and integral with said ring flange and a skirt including a maximum thrust face integral with said wrist pin bosses and extending between the same on one side, said maximum thrust face having a curvature slightly greater than that of a true cylinder concentric with said ring flange and being integral at its upper edge with the lower edge of said ring flange, and a minimum thrust face integral with said bosses and extending between the same on the opposite side thereof and having a curvature substantially greater than the curvature of said maximum thrust face, said minimum thrust face being spaced at its upper edge from the lower edge of said ring flange, and having a substantially vertical slot extending from the upper edge thereof towards but terminating short of the lower edge.

5. A piston comprising a head having depending aligned wrist pin bosses integral therewith and a skirt integral with said wrist pin bosses and said head and having opposed thrust faces on the opposite sides of said bosses, one of said thrust faces having an inwardly projecting thickened portion extending substantially vertically along the center thereof, the upper edge of said thrust face being separated from said head by a horizontal slot and said thrust face having a substantially vertical slot in said thickened portion intersecting said horizontal slot.

6. A piston comprising a head having depending aligned wrist pin bosses integral therewith and a skirt integral with said wrist pin bosses and said head, and having opposed thrust faces on the opposite sides of said bosses, one of said thrust faces having an inwardly projecting thickened portion extending substantially vertically at the center thereof and terminating short of the bottom of the skirt, and a substantially vertical slot in said thrust face cut through said thickened portion and terminating short of the bottom thereof.

7. A piston comprising a head having a depending substantially cylindrical ring flange and aligned wrist pin bosses depending below and integral with said ring flange, and a circumferentially integral skirt including a maximum thrust face integral with and extending between the sides of said wrist pin bosses on one side thereof and having a curvature in cross section substantially conforming to an arc struck from a center spaced towards said thrust face from the center line of said piston and being continuously integral throughout its upper edge with the lower edge of said ring flange, and a minimum thrust face integral with and extending between said wrist pin bosses on the opposite side thereof having a curvature in cross section substantially conforming to an arc struck from the center spaced toward said thrust face from the center line of the piston a substantially greater distance than said first mentioned center, said minimum thrust face being separated at its upper edge from said ring flange by a horizontal slot and having a substantially vertical slot intersecting said horizontal slot, said skirt being circumferentially continuous below said wrist pin bosses.

8. An internal combustion engine piston composed of a material having a relatively high coefficient of expansion and formed from a continuous one-piece cup-shaped casting, said piston including a head having a depending ring flange, and a skirt having aligned wrist pin bosses formed therein, said skirt including a maximum thrust face on one side of the wrist pin bosses having a curvature substantially greater than the curvature of a cylinder in which the piston is designed to operate, the upper edge of said maximum thrust face and the upper edge of the portions of the skirt above the wrist pin bosses being continuously integral with the lower edge of said ring flange, and a minimum thrust face on the opposite side of said wrist pin bosses having a curvature substantially greater than the curvature of said maximum thrust face, the upper edge of said minimum thrust face being separated from said ring flange by a slot.

9. An internal combustion engine piston composed of a material having a relatively high coefficient of expansion and formed from a continuous one-piece cup-shaped casting, said piston including a head having a depending ring flange and a skirt having aligned wrist pin bosses formed therein, said skirt including a maximum thrust face on one side of the wrist pin bosses having a curvature substantially greater than the curvature of a cylinder in which the piston is designed to operate, the upper edge of said maximum thrust face and the upper edge of the portions of the skirt above the wrist pin bosses being continuously integral with the lower edge of said ring flange, and a minimum thrust face on the opposite side of said wrist pin bosses having a curvature substantially greater than the curvature of said maximum thrust face, the upper edge of said minimum thrust face being separated from said ring flange by a slot, and a substantially vertical slot formed in said maximum thrust face intersecting said first mentioned slot and terminating short of the bottom of the skirt.

10. An internal combustion engine piston composed of a material having a relatively high coefficient of expansion and formed from a continuous one-piece cup-shaped casting, said piston including a head having a depending ring flange and a skirt having aligned wrist pin bosses formed therein, said skirt including a maximum thrust face on one side of the wrist pin bosses having a curvature substantially greater than the curvature of a cylinder in which the piston is designed to operate, the upper edge of said maximum thrust face and the upper edge of the portions of the skirt above the wrist pin bosses being continuously integral with the lower edge of said ring flange, and a minimum thrust face on the opposite side of said wrist pin bosses having a curvature substantially greater than the curvature of said maximum thrust face, the upper edge of said minimum thrust face being separated from said ring flange by a slot, and a substantially vertical slot formed in said maximum thrust face intersecting said first mentioned slot and terminating short of the bottom of the skirt, and said skirt being uniformly slightly smaller at the bottom than at the top.

11. A one-piece aluminum alloy piston designed to reciprocate in an internal combustion engine cylinder, comprising a head, and a skirt having aligned wrist pin bosses formed therein, said skirt including a maximum thrust face on one side of the wrist pin bosses integral with the head and being curved when cold in such a manner as to have a minimum clearance with respect to the cylinder at the center, small enough to prevent piston slap and a progressively increasing clearance with respect to the cylinder at points spaced on each side of the center, the increasing clearance being insufficient to permit piston slap from lateral play of the piston along the wrist pin axis, and said skirt having a minimum thrust face on the opposite side of the wrist pin bosses separated at its upper edge from the head and slotted to accommodate expansion of the skirt, said minimum thrust face being curved in such a manner as to have a minimum clearance at its center corresponding to the clearance at the center of the maximum thrust face and to have a greater clearance at points spaced on each side of the center of the thrust face substantially greater than the clearance of corresponding points on the maximum thrust face.

12. A piston comprising a head having a depending ring flange, and a skirt having wrist pin bosses formed therein and having its upper edge separated from the lower edge of said head on one side of the piston by a substantially horizontal slot extending toward but terminating on each side short of the vertical plane through the wrist pin axis, integral connections between the upper edge of the skirt and the lower edge of the ring flange above each of said wrist pin bosses, said skirt being formed with a substantially vertical slot intersecting said horizontal slot and extending toward but terminating short of the open end of the skirt, and means reenforcing the piston walls at each end of said horizontal slot and at the lower end of said substantially vertical slot to prevent splitting of the piston.

13. A piston comprising a head having a substantially cylindrical depending ring flange, and a skirt having aligned wrist pin bosses formed therein, said skirt having bearing portions on opposite sides between said wrist pin bosses and having its upper edge above one of said bearing portions separated from the lower edge of said ring flange by a substantially horizontal slot, walls integrally uniting said skirt with said ring flange above and in the vertical zone of said wrist pin bosses, said walls being formed with inwardly projecting thickened portions and each end of said horizontal slot terminating in one of said thickened portions.

14. A one-piece strutless aluminum alloy internal combustion engine piston, comprising a head, and a skirt having aligned wrist pin bosses formed therein, said skirt including a maximum thrust face on one side of the wrist pin bosses integral at its upper edge with the head and being of oval curvature when cold in order to have a minimum clearance with respect to the cylinder at its center small enough to prevent piston slap, and a progressively increasing clearance with respect to the cylinder at points spaced on each side of the center, the increasing clearance being insufficient to permit piston slap from lateral play of the piston along the wrist pin axis, said maximum thrust face being unslotted, and said skirt also including a minimum thrust face on the opposite side of the wrist pin bosses separated at its upper edge from the head and being formed with a substantially vertical slot extending toward but terminating short of the lower edge of the skirt and being otherwise unslotted, and said skirt also including a circumferentially continuous band at its lower end below the end of said substantially vertical slot, said minimum thrust face being of oval curvature in order to have a minimum clearance with respect to the cylinder at its center corresponding to the clearance at the center of the maximum thrust face and to have a progressively increasing clearance with respect to the cylinder at points spaced on each side of the center, the increasing clearance being sufficient to prevent scoring or binding against the cylinder of said circumferentially continuous band at the lower end of the piston skirt.

FRANK JARDINE.